Sept. 1, 1931. W. G. JOHNSON 1,821,642
CASTER
Filed Sept. 16, 1929

INVENTOR.
Wilfred G. Johnson
BY
Slough and Caufield
ATTORNEY.

Patented Sept. 1, 1931

1,821,642

UNITED STATES PATENT OFFICE

WILFRED G. JOHNSON, OF ELYRIA, OHIO, ASSIGNOR TO THE COLSON COMPANY, OF ELYRIA, OHIO, A CORPORATION OF OHIO

CASTER

Application filed September 16, 1929. Serial No. 393,077.

This invention relates to casters.

One of the objects of this invention is to provide a caster which will be cheap to manufacture, simple to construct and assemble and durable and efficient in operation.

Another object is to provide a caster having an improved anti-friction swivel bearing.

Another object is to provide a caster having an improved swivel bearing of the ball type.

Another object is to provide a caster having a swivel bearing of the ball type from which dirt, etc. may be excluded from and lubricant retained in the bearing.

Another object is to provide a caster having swivel bearing of the ball type, the balls of which are enclosed and shielded in an improved manner.

Another object is to provide a caster having swivel ball bearing, in which the fit between the balls and the races may be conveniently and easily adjusted during the assembling of the bearing or subsequently to take up wear.

Another object is to provide a caster having an antifriction swivel bearing of the ball and race type, of which the balls and races may be enclosed within an integrally formed chamber adapted to permit easy assembling of the parts of the bearing through apertures of the chamber.

Other objects will be apparent to those skilled in this art.

My invention is fully disclosed in the following description taken in connection with the accompanying drawings, in which:—

Figure 1:
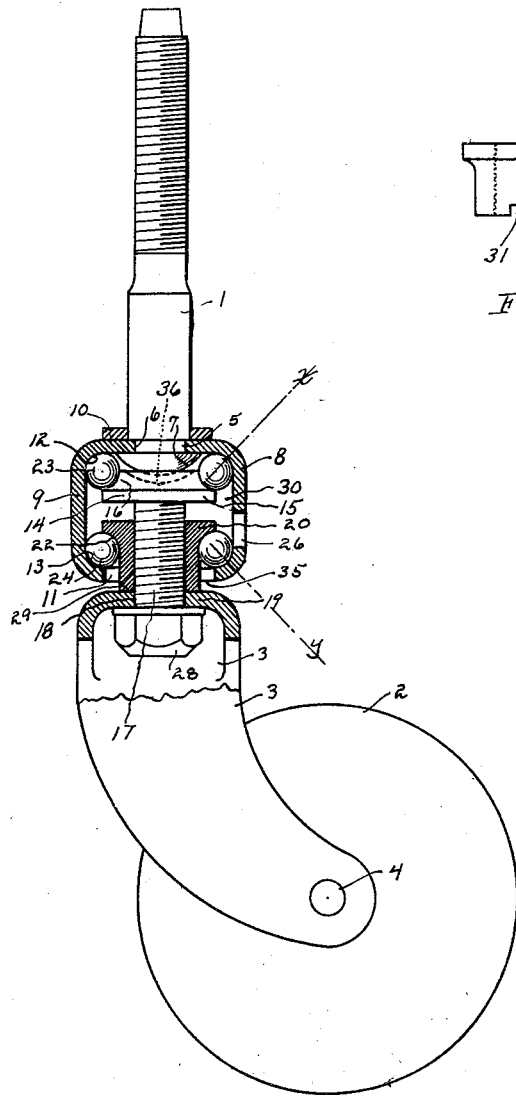
Fig. 1 is a side sectional view of a caster embodying my invention with some of the parts shown in elevation.

While my invention is applicable to casters of various types, I have chosen to illustrate and describe it in connection with a caster of the so-called "stem" type.

At 1 is indicated the stem by which the caster may be attached to or connected with the piece of furniture or other article to be supported. At 2 is indicated a caster wheel and at 3—3 the caster forks in which at 4 the wheel is rotatably mounted. These parts form no essential part of my present invention and may be variously constructed.

The lower end of the stem 1 has a neck 5 inserted through a perforation 6 in a bearing housing 8 and riveted over therein as at 7 to rigidly secure the stem and housing together. The bearing housing 8 is generally cylindrical having a cylindrical side wall 9; and its upper end is closed by a generally circular top wall 10 in which the perforation 6 is provided. The chamber 30 thus provided is downwardly open having in the lower floor 35 thereof the relatively large perforation 11. It is through the perforation 11 that the riveted head 7 above described may be formed, and that bearing parts are inserted into the chamber to be assembled. A perforation 26 in the wall 9 of the chamber is provided to admit bearing balls to be described.

The upper and lower circular corners between the top wall 10 and side wall 9 and between the side wall 9 and the floor 35 are rounded, thus providing on the inner surface or inner walls of the chamber 30 an upper and a lower internal ball race way 12 and 13; that is to say, these upper and lower circular corners of the chamber are made to conform to circular profiles, in planes through the stem axis or swiveling axis and serve as race ways, thus providing a very simple race way construction.

An upper race element 14 is provided comprising a generally washer shaped head portion 15 having on its upper side at its periphery a race way 16 and being connected to a downwardly axially extending screw threaded stud 17. The stud 17 extends downwardly out through the perforation 11 of the chamber and on through a suitable perforation 18 in the transverse portion 19 of the yoke 3—3.

Figure 3:
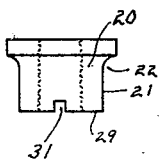
Fig. 3 is an individual view of the parts shown in Fig. 1.
Figure 2:
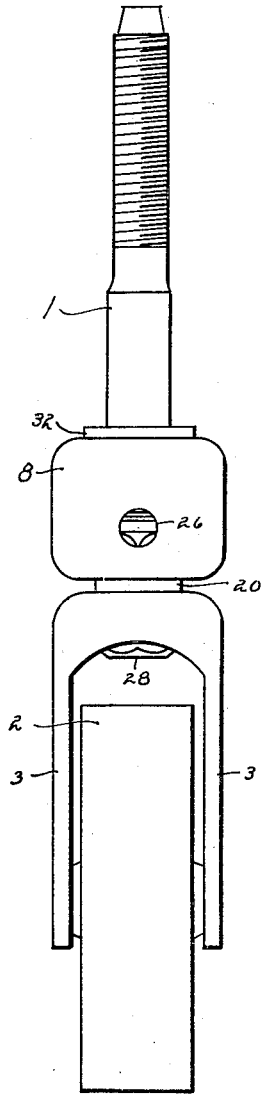
Fig. 2 is an elevational view of the caster of Fig. 1 taken from the front thereof.

Threaded on the stud 17 is a lower race element 20 of general cylindrical form, shown separately in Fig. 3 and having its external cylindrical surface turned down, as at 21, to form a race way 22.

Between the race way 16 and the race way 12 is a circular row of steel bearing balls 23, and between the race way 22 and the race way 13 is another row of steel bearing balls 24.

The race way 16 is so shaped and proportioned that when in engagement with the balls 23, as illustrated the lines of action through the balls 23 are in the general direction of the line $x$; and correspondingly, the lines of action through the balls 24 are in the direction of the line $y$, as will be understood.

In assembling the parts of the bearing thus far described, after the stem 1 is riveted in place, as described, the stem and chamber 30 are preferably turned upside down; the balls 23 are inserted into the chamber 30 through the perforation 11 in the wall 35 of the chamber and dispose themselves around the rivet head 7.

The race element 14 is then inserted through the perforation 11 in the bottom of the chamber, the outside diameter of the element 14 being suitably proportioned to pass through the perforation 11, and the race way 16 is rested upon the balls 23.

Next, the race element 20 is threaded onto the stud 17 until it comes substantially into engagement with the race element 14. The balls 24 are then passed through the perforations 26 until they rest upon the race way 22.

The race way 20 is then reversely screwed on the stud 17 separating the two race elements and carrying with it the balls 24 until they come into engagement with the race way 13 of the chamber. The device may now be turned right side up and the balls will be maintained in their race ways. By a refined adjustment of the race element 20 on the stud 17, the clearance or fit between each set of balls 23 and 24 and the race ways thereof may be adjusted.

The yoke 3—3 may now be attached by passing the stud 17 through the perforation 18 in the transverse portion 19 of the yoke and screwing a nut 28 on the free end of the stud clamping the transverse portion 19 of the yoke firmly against the lower squared end 29 of the race element 20.

To turn the race element 20 on the threaded stud 17, tool slots 31 may be provided in the lower end 29 of the race element 20.

As will be understood at any time after assembly the parts may easily be disassembled by removing the nut 28 or similarly they may be adjusted to adjust the fit of the balls in their races or to remove parts for renewal.

Lubricant may be inserted into the interior of the chamber 30 through the perforation 26 and if desired the perforation 26 may be sealed with a plug in any suitable or known manner. It will be observed that by the construction of the chamber all of the parts of the bearing are covered or shrouded and dust and dirt cannot gain access thereto.

Furthermore, by the arrangement of the balls and their races load on the stem 1 will be rigidly supported and by suitably proportioning the vertical dimension of the chamber 30 the lateral thrusts transmitted from the wheel 2 will be absorbed by the ball bearings without lost motion. If preferred, the supported load may rest directly upon the chamber 30 upon a suitable washer 32.

It will be observed that after the bearing has been once adjusted as above described, the screwing up tight of the nut 28 will lock the adjustment against accidental change, the nut 28 and the race element 20 serving as lock nuts on the stud 17.

In assembling the parts of the bearing, if preferred, the race element 20 may be screwed upon the stud 17 into engagement with the race element 14 before the latter is inserted into the chamber, this being an alternative mode of assembling.

In order to contribute to compactness of design and to insure clearance between the rivet head 7 and the race element 14, the upper surface of the race element 14 is preferably cupped out, as indicated by the dotted line at 36 in Fig. 1.

Having thus described my invention in a preferred embodiment, I am aware that numerous and extensive departures may be made therefrom, but without departing from the spirit of my invention.

I claim:

1. In a caster, a tubular housing terminated at its ends in inturned annular flanges, providing a pair of longitudinally spaced race ways at the inner surfaces of the adjoining inner lateral and inner end flange walls, a caster wheel yoke element, a threaded stud projecting outwardly from the intermediate portion of said yoke element, a bearing race cone screw threaded onto said stud and having a radial flange disposed within the tubular casing and a tubular flange extending through an end of the casing, a set of bearing balls disposed in contact with one of said racing faces and cooperating ball race surfaces formed by adjoining portions of said cone radial flange and tubular flange, a second set of bearing balls for the other casing race and a cooperating bearing element having ball bearing race surfaces for the latter set of balls supported by said threaded stud.

2. In a ball bearing construction, a housing, a pair of axially aligned spaced circular ball race ways in the housing, a pair of spaced race way elements in the housing, the race way elements each providing a ball race way, the race ways in the race elements being axially aligned with the race ways in the housing and disposed between the latter, a plurality of balls between one of the race ways in the housing and one of the race ways in the race elements, a plurality of balls between the other two race ways, means for adjusting the relative axial position of the race elements to vary the clearance between the balls and the race ways.

3. In a caster, a tubular housing terminated at its ends in inturned annular flanges, providing a pair of longitudinally spaced race ways at the inner surfaces of the adjoining inner lateral and inner end flange walls, a caster wheel yoke element, a threaded stud projecting outwardly from the intermediate portion of said yoke element, a bearing race cone screw threaded onto said stud and having a radial flange disposed within the tubular casing and a tubular flange extending through an end of the casing, a set of bearing balls disposed in contact with one of said racing faces and cooperating ball race surfaces formed by adjoining portions of said cone radial flange and tubular flange, a second set of bearing balls for the other casing race and a cooperating bearing element having ball bearing race surfaces for the latter set of balls supported by said threaded stud, and a caster pintle rigidly secured to said casing and extending from an end thereof oppositely to said stud.

4. A bearing comprising a pair of relatively rotatable oppositely extending elements, a tubular bearing ball casing supported by an end wall on one of said elements, said casing terminating at its opposite end in an annular inturned flange, and providing at its opposite ends interiorly disposed longitudinally spaced axially aligned bearing ball races, a pair of sets of bearing balls for each of said races and separate bearing race elements for each of said sets of bearing balls, one of said elements screw threaded onto a stem portion of the other element and affixed thereby to the other one of said pair of oppositely extending relatively rotatable elements.

5. In a caster, a load supporting element, a caster yoke, a perforation in the yoke, a stud extending through the perforation, a nut on one side of the perforation, a nut race element on the other side of the perforation, the nut race element, yoke and nut and stud being adapted to be rigidly locked together by screwing the nut on the stud, a race way on the nut race element, a head on the stud, a race way on the head, a housing connected to the load supporting element, a cylindrical wall of the housing, coaxial with the stud, an upper and a lower wall of the housing, at the opposite ends of the cylindrical wall, race ways in the corners between the two end walls and the cylindrical wall and balls in the race ways.

6. In a caster wheel bearing mechanism, the combination with a caster fork including a fork yoke, a bolt projected from within the fork outwardly through the yoke, a nut on the outside of the yoke clamping the bolt thereto and providing a bearing race on its outer surface, an annular flange for said nut towards its outer end portion forming at least a part of said race, a disk carried on the end of said bolt, beyond said nut and a tubular bearing cage having inturned end flanges enclosing said nut and disk, and two sets of bearing balls within the cage, one intermediate the lower inner surfaces of said cage, and said bearing race surfaces of said nut, the other intermediate the upper surfaces of said disk and inner upwardly disposed surfaces of said cage.

In testimony whereof I hereunto affix my signature this 27th day of August, 1929.

WILFRED G. JOHNSON.